MALCOLM STEWART.

Improvement in Potato Diggers.

No. 121,906.　　　　　　　　　　　Patented Dec. 12, 1871.

UNITED STATES PATENT OFFICE.

MALCOLM STEWART, OF SOUTHFIELD, MICHIGAN.

IMPROVEMENT IN POTATO-DIGGERS.

Specification forming part of Letters Patent No. 121,906, dated December 12, 1871.

*To all whom it may concern:*

Be it known that I, MALCOLM STEWART, of Southfield, in the county of Oakland and State of Michigan, have invented a new and Improved Machine for Digging Potatoes, of which the following is a specification:

My invention relates to a novel form and arrangement of teeth or bars, to be secured to a wide digging-blade or share so as to project rearwardly therefrom; the object thereof being to completely break and remove the soil adhering to the potatoes, to separate them from their vines, and to leave them in the center of the furrow from which they are dug. My invention relates, also, to a simple attachment and combination of handles and draft-bars with the digging-blade to obtain a cheap, light, and effective implement.

Figure 1:
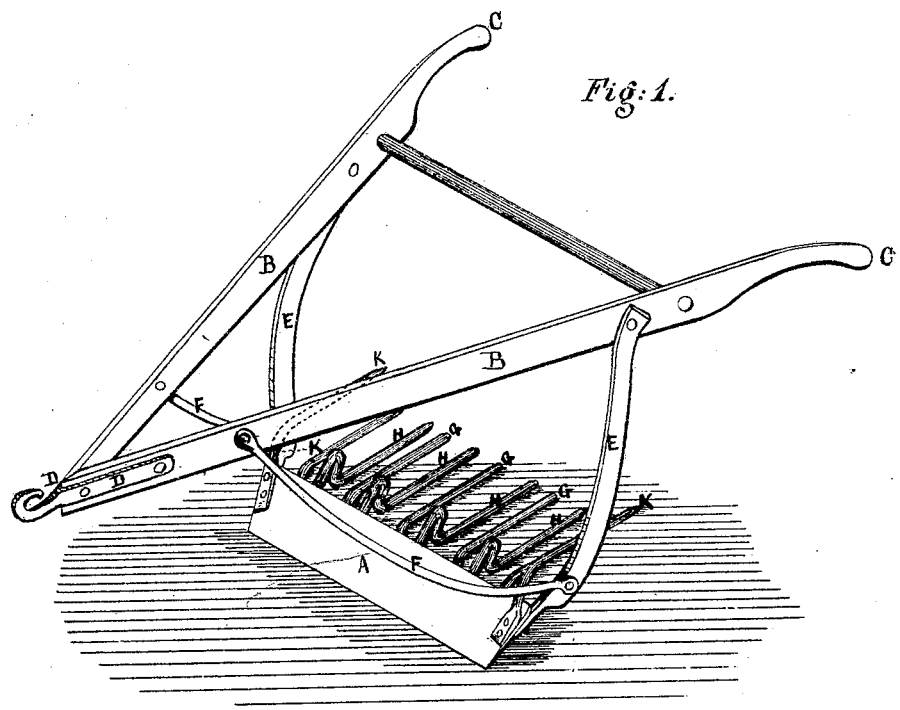
Figure 2:
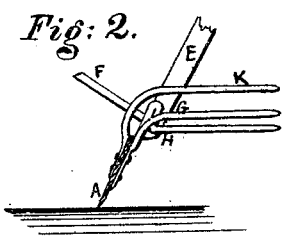

In the accompanying drawing, Figure 1 is a view, in perspective, of my improved potato-digger; and Fig. 2, a sectional view, illustrating the combination of the separating-bars or teeth with the digging-blade.

A is a metallic blade, made, by preference, of steel plate, of a length somewhat greater than the ordinary width of a row of potatoes. Its lower edge is made some four inches shorter than its upper edge so as to gather as little soil as possible with the potatoes. B B are two draft-bars, terminating in handles C C, and united together at their front ends by and with a clevis-iron, D. The digging-blade A is secured to these draft-bars by metallic rods or bars E E, riveted to the ends of the blade on the under side thereof, and secured to each arm B, as illustrated in the drawing, Fig. 1, so as to hold the blade at an angle of about forty-five degrees, more or less. F F are small brace-rods extending diagonally toward the front from the lower ends of the supporting-bars E E to the draft-bars B B. These braces are outwardly curved in their center to prevent interference with the potato-tops. G G H H are a series of small separating-rods or teeth riveted to the under or rear face of the digging-blade or share A. Every alternate rod G G extends upwardly in a line parallel with the face of the share some two inches, more or less, and is then bent back (see Fig. 2) to form an angle with the share of about one hundred and twenty degrees. Each of the remaining intermediate rods H H extends upwardly some three or four inches above the upper edge of the share, and is then doubled back upon itself for some two or three inches, more or less, so as to form an upwardly-projecting spur, (see Figs. 1 and 2,) and again bent so as to project in a plane parallel with the projecting ends of the rods G G, first decribed. These upwardly-projecting spurs break and divide the soil and cause it to sift through between the rods, leaving the potatoes to roll off in the rear, entirely separated therefrom. K K are rods secured to the outer ends of the share, and which, extending upwardly to about the same height above the share as the spurred rods H, are then bent back rearwardly in a plane parallel with the ends of the rods G and H, and are also bent inwardly so as to force the potatoes toward the center as they pass over the lower separating-rods and cause them to drop in the middle of the furrow opened by the share, thus obviating the necessity of removing them before digging the next adjoining row.

My improved digger may be constructed to be drawn by one or two horses, and is light, cheap, and efficient.

I claim as my invention—

1. The spurred rods or teeth H H, in combination with alternate curved rods or teeth G G projecting rearwardly from the scraper A of a potato-digger, substantially in the manner and for the purpose herein set forth.

2. The scraper A, curved bars E E, and braces F F, in combination with each other and with the handle-beams B B, when arranged and constructed substantially as and for the purpose herein set forth.

MALCOLM STEWART.

Witnesses:
ELLA STEWART,
J. WATERS. (114)